United States Patent [19]

Hluchyj et al.

[11] Patent Number: 5,268,900
[45] Date of Patent: Dec. 7, 1993

[54] DEVICE AND METHOD FOR IMPLEMENTING QUEUEING DISCIPLINES AT HIGH SPEEDS

[75] Inventors: Michael G. Hluchyj, Wellesley; Amit Bhargava, Somerville, both of Mass.

[73] Assignee: Codex Corporation, Mansfield, Mass.

[21] Appl. No.: 726,065

[22] Filed: Jul. 5, 1991

[51] Int. Cl.⁵ .............................................. H04J 3/26
[52] U.S. Cl. .................... 370/94.1; 370/85.6
[58] Field of Search ................ 370/94.1, 60, 85.6, 370/85.7, 79

[56] References Cited

U.S. PATENT DOCUMENTS

| | | | |
|---|---|---|---|
| 4,623,996 | 11/1986 | McMillen | 370/60 |
| 4,771,424 | 9/1988 | Suzuki et al. | 370/60.1 |
| 4,862,454 | 8/1989 | Dias et al. | 370/94 |
| 4,868,813 | 9/1989 | Suzuki | 370/160 |
| 4,901,348 | 2/1990 | Nichols et al. | 380/6 |
| 4,914,650 | 4/1990 | Sriram | 370/60 |
| 5,001,702 | 3/1991 | Teraslinna et al. | 370/60 |
| 5,128,924 | 7/1992 | LeBihan | 370/60 |

OTHER PUBLICATIONS

"Frame Losses Due To Buffer Overflows In Fast Packet Networks", by Amit Bhargava and Michael G. Hluchyj, Proceedings IEEE Infocom '90, San Francisco, Calif., Jun. 1990.

"An Efficient Packetized Voice/Data Network Using Statistical Flow Control", by James W. Forgie and Alan G. Nemeth, Proceedings of National Computer Conference, Chicago, Ill., Jun. 1977.

"An Integrated Access Terminal For Wideband Packet Networking: Design and Performance Overview", Proceedings International Switching Symposium '90, Stockholm, Sweden, Jun. 1990.

Primary Examiner—Douglas W. Olms
Assistant Examiner—Min Jung
Attorney, Agent, or Firm—Darleen J. Stockley

[57] ABSTRACT

A device (800) and method (900) are included for providing a high-rate queueing discipline in an information network system having a plurality of traffic classes. The high-rate queueing discipline is based on a scan table-based dequeueing scheme having a scan table that is precomputed and stored in memory, thus facilitating rapid processing of different traffic class information. The device and method are particularly useful in a fast packet system.

70 Claims, 3 Drawing Sheets

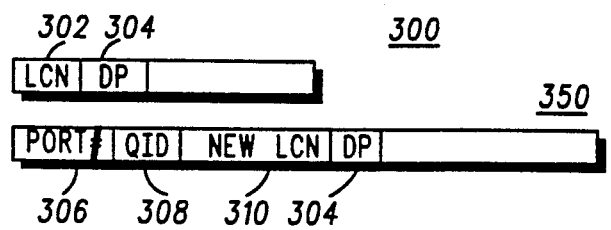
FIG. 3A —PRIOR ART—
FIG. 3B —PRIOR ART—
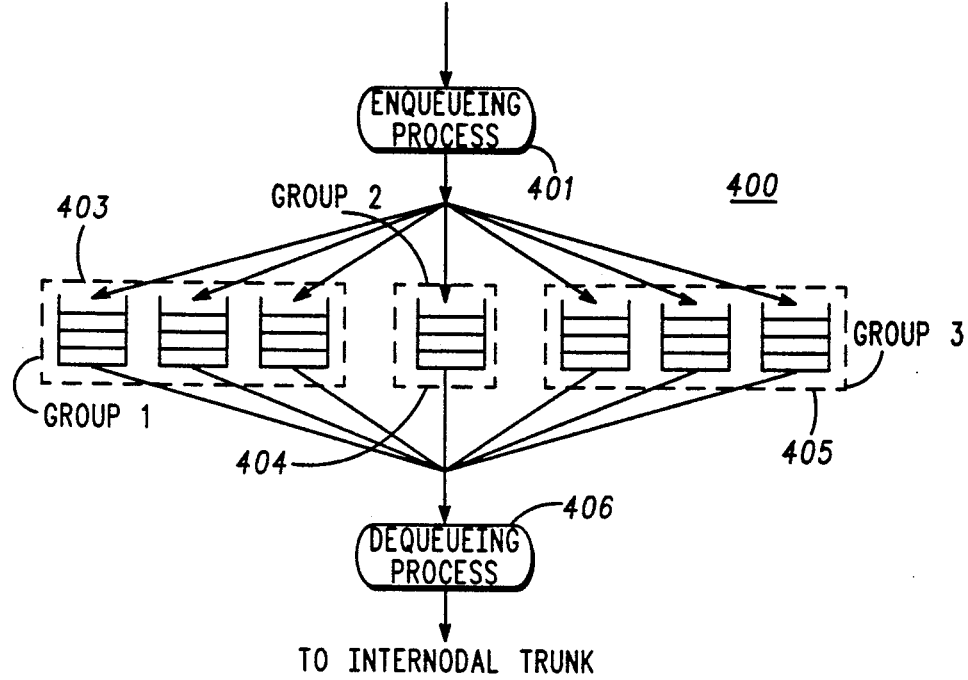
FIG. 4
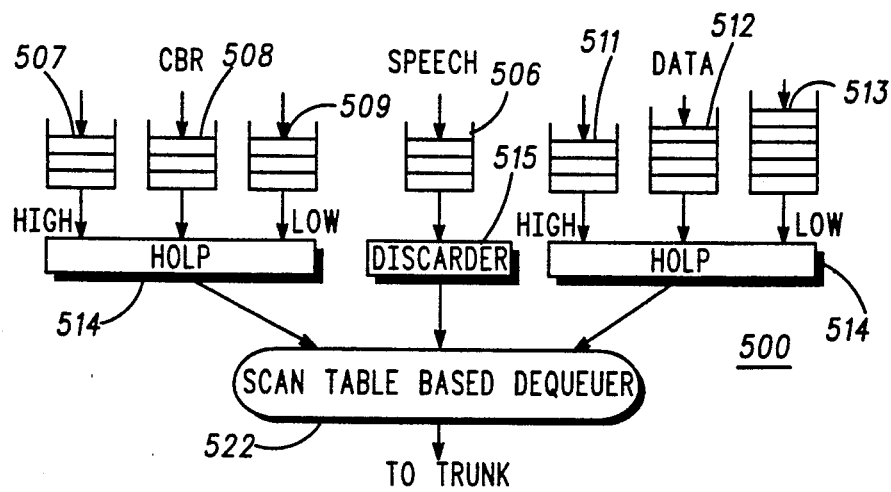
FIG. 5

DEVICE AND METHOD FOR IMPLEMENTING QUEUEING DISCIPLINES AT HIGH SPEEDS

CROSS-REFERENCE TO RELATED APPLICATION

This application is related to the pending application: Method for Prioritizing Selectively Discarding and Multiplexing Differing Traffic Type Fast Packets; Bhargava, Amit, Hluchyj, Michael G., and Yin, Nanying, Inventors; Codex Corporation, Assignee; filed Jul. 11, 1990.

FIELD OF THE INVENTION

The present invention relates generally to integrated packet networks, and more particularly to prioritization, at a network trunk node, of packets of different traffic classes and discarding of selected packets.

BACKGROUND OF THE INVENTION

Increasing use of data communications has furthered development of techniques that provide more cost-effective means of utilizing existing channels of communication networks. One such technique is packetization of traffic information and transmission of the packets between end systems in an efficient manner. A packet is typically a group of binary digits, including at least data and control information, that is switched as a whole unit. FIG. 1, numeral 100, illustrates a typical integrated communication network, as is known in the art. Before the flow of packets between end systems begins, a connection or virtual circuit is established between them, determining an end-to-end path with selected nodes and internodal trunk(s) through which the packets will follow. FIG. 1 illustrates a typical integrated communications network having an integrated services digital network (ISDN)(102) that allows packet-switching among a private branch exchange (PBX)(104), a public-switched telephone network/integrated services digital network (PSTN/ISDN)(106) having V0.32 modems (V0.32)(108), a dataphone digital service (DDS)(110), and an ISDN basic rate interface (BRI)(112), an image source (Image)(114), a video source, (Video)(116), two local area networks (LAN)(118A, 118B), and a packet data network (X0.25 PDN)(120). Where desired, a host computer (Host)(122) may be utilized. A network manager (Net Mgr)(124) provides network control along three nodes (126A, 126B, 126C).

Generally integrated packet networks (typically fast packet networks) are utilized to carry at least two classes of traffic. Classes of traffic may include, for example, continuous bit-rate (CBO), speech (Packet Voice), data (Framed Data), image, and so forth. Typical bandwidth characteristics and requirements of selected traffic classes are described below.

CBO: Packets from individualized sources are fairly well-behaved and arrive at internodal queues more or less periodically. The peak rate ($R_{peak}$) of multiplexed CBO sources is substantially the same as the average rate ($R_{ave}$), and a trunk rate required ($R_{reqd}$) is somewhat larger to keep queueing delays small. Since $R_{peak} < R_{reqd}$, no statistical gain is obtained in this case. CBO streams are sensitive to severe fluctuations in queueing delay and to packet losses since both of these cause a loss in synchronization at the receiver. Packets from CBO sources with large packetization times have large delays when multiplexed together, as opposed to packets from sources with small packetization times. When multiplexed together, the delays are dominated by the large packetization time sources.

Packet Voice (with speech activity detection): The rate of multiplexed voice depends on a number of sources simultaneously in talk spurt, and fluctuates between the maximum rate ($R_{peak}$) and zero. The average rate ($R_{ave}$) is less than half of $R_{peak}$ for conversational speech. The required rate ($R_{reqd}$) can be made to lie between these two rates rather than being made equal to $R_{peak}$, making statistical gain (i.e., $R_{peak}/R_{reqd}$) possible. $R_{reqd}$ is selected to keep maximum delay and a packet loss rate under predetermined limits. A small loss is acceptable, causing only limited degradation in voice quality.

Packets of multiplexed voice with excessive delays, for example, delays of a few hundred milliseconds, are also dropped at a destination based on an end-to-end delay limit, since voice is delay-sensitive. This type of dropping provides a high probability that several packets will be lost consecutively from a same voice call, causing serious degradation of fidelity of the received voice signal.

Framed data: This type of traffic can have large fluctuations in rate and in a difference between $R_{peak}$ and $R_{ave}$. $R_{reqd}$ is selected to maintain end-to-end average frame delays below a predetermined low level. Loss of a single fast packet results in loss of an entire frame. Thus, it is not desirable to drop packets. However, the bursty nature of data traffic generally results in some degree of packet loss. Further, quality of service (QOS) varies for data traffic from different sources, for example, data file transfers being less delay sensitive than interactive data traffic.

Intermediate nodes typically utilize a switch (201), as illustrated in FIG. 2, numeral 200, wherein fast packets received from an input trunk (202, 204, . . . ) are switched (209, . . . 211) to an output trunk (210, . . . , 212). Packets that come in on an internodal trunk from each connection have a unique packet header field called a Logical Channel Number (LCN)(302), corresponding to a logical channel on that trunk (FIG. 3A, numeral 300). Upon connection of the virtual circuit, a table is updated at each node such that the table contains entries for an output Port number, a Queue ID (QID) of the output queue, and a new LCN. Utilizing the table, the LCN of each incoming packet is translated to a new Port number (306), a QID (308) for an output routing queue, and a new LCN (310) for a next internodal trunk (FIG. 3B, numeral 350). A discard priority (304) typically remains unchanged. Packets from various output queues are transmitted or discarded according to a preselected queueing system.

The simplest technique for queueing packets for transmission on an internodal trunk of a fast packet network is using a first-in-first-out (FIFO) queue. However, utilizing the FIFO queueing technique allows overload periods for digitized speech packets and for framed data packets, providing a greater share of bandwidth to one at the expense of the other, an undesirable result.

Another technique, Head-Of-Line-Priority (HOLP) may give data priority over speech, but does not solve the problem of data and speech queues affecting the quality of service of each other and of continuous bit-rate data fast packets under overload conditions. In HOLP, where speech fast packets are given a high priority, speech fast packets may affect the quality of service of lower priority queues.

Movable boundary schemes for multiplexing speech and data traffic classes of fast packets often have undesirable delay jitter and underutilize bandwidth allocated to queues having no traffic.

Queueing schemes for data only do not focus on problems of integrating other traffic types, such as speech and continuous bit-rate data.

While packet discarding schemes relieve congestion in an integrated speech/data network, important fast packets may be discarded when queues become filled. Also, when queues are full, arriving fast packets may be dropped. There is a need for a method and device that provide multiple levels of congestion thresholds for determining selective packet discarding and that avoid dropping arriving fast packets when a queue is full, alleviating the above problems and providing for queueing at a higher rate to allow a higher speed, more efficient operation of integrated communication networks.

SUMMARY OF THE INVENTION

A device and method are included for implementing queueing disciplines at high speeds for a network having different traffic class information, comprising: at least a first input receiver, operably coupled to a network, for receiving first traffic class information from a plurality of first sources; at least a first prioritizer, operably coupled to the at least first input receiver, for prioritizing at least some of the first traffic class information pursuant to a first prioritization method for transmission; at least a second input receiver, operably coupled to the information network, for receiving second traffic class information from a plurality of second sources, which second traffic class is different from the first traffic class; at least a second prioritizer, operably coupled to the at least second input receiver, for prioritizing at least some of the second traffic class information for transmission pursuant to a second prioritization method that is different from the first prioritization method; a scan tablebased dequeuer, operably coupled at least to the first prioritizer and the second prioritizer, for scan table-based dequeueing and transmission of at least the first and second traffic class information.

In one embodiment, the information network may be selected to be a fast packet network. Also, where desired, the scan table-based dequeuer may be selected to comprise one of: a precomputed head-of-line queueing based scan table; a weighted round robin queueing based scan table; and a scan table based on a combination of precomputed head-of-line queueing and weighted round robin queueing; at least a precomputed head-of-line-priority and weighted round-robin based scan table, operably coupled at least to the first prioritizer and the second prioritizer, for substantially determining bandwidth allocation for queues.

BRIEF DESCRIPTION OF THE DRAWINGS

FIGS. 3A and 3B illustrate a prior art depiction of a packet information header as initially received and as subsequently processed by an analysis block for the prior art switch.

FIG. 4 depicts general enqueueing and dequeueing processes.

FIG. 5 illustrates a first embodiment of a trunk queueing discipline in accordance with the present invention.

DETAILED DESCRIPTION OF A PREFERRED EMBODIMENT

Figure 1:
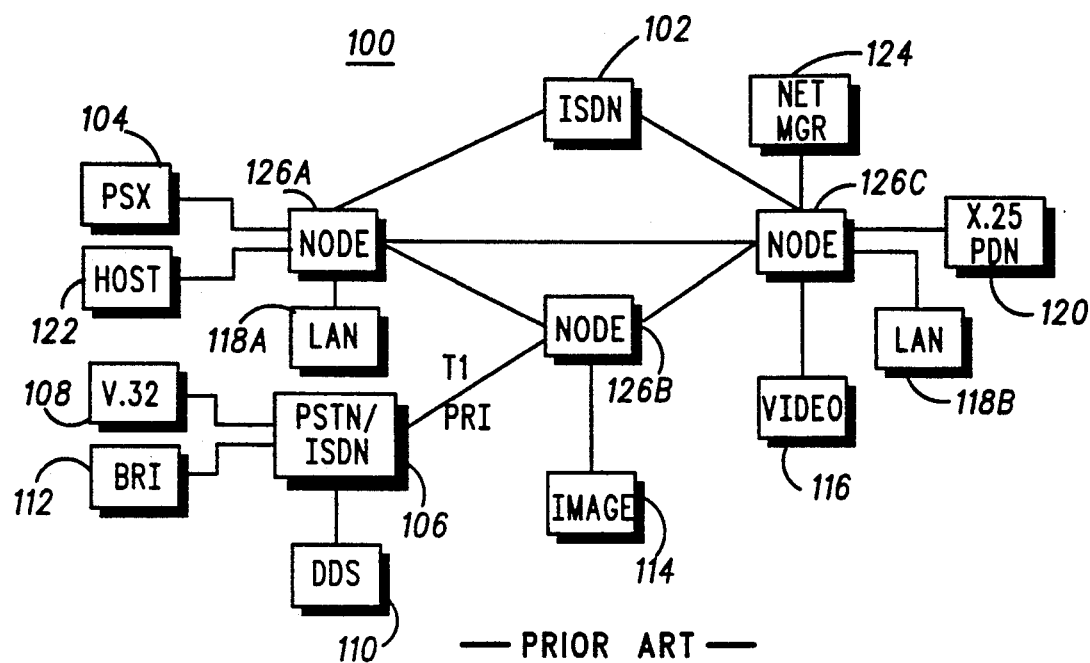
FIG. 1 illustrates a typical integrated communications network as is known in the art.
Figure 2:
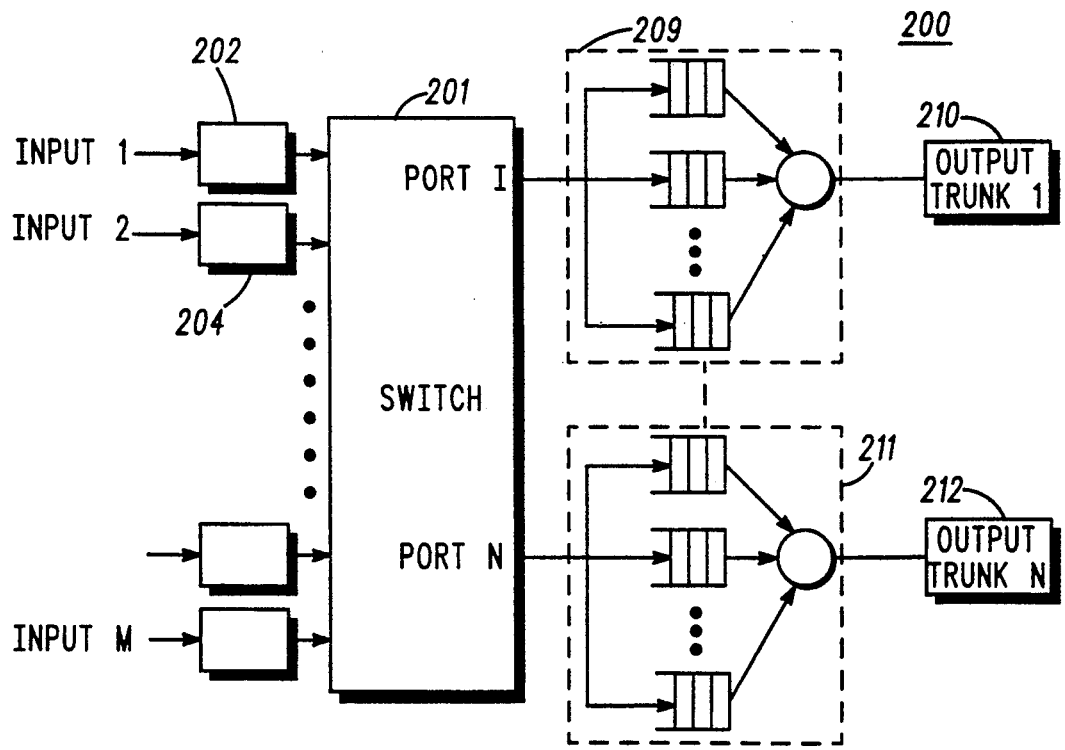
FIG. 2 illustrates a prior art fast packet switch with input analysis and output queueing.

The present invention alleviates the problems described above, prevents any class of traffic from using more than a predetermined share of bandwidth via a scan table oriented, scan table-based dequeueing technique, and offers quality of service matching. For example, in a selected embodiment, a scan table may be selected to be based on one of: a HOLP technique, a weighted round-robin technique, and a combination of HOLP and weighted round robin techniques. Other dequeueing techniques may be utilized without departing from the invention, and utilization of alternate scan table-based dequeueing techniques is a modification included within the spirit and scope of the present invention.

FIG. 4, numeral 400, depicts general enqueueing and dequeueing processes modified in the present invention, as set forth below, to provide a high-rate queueing discipline in a packet network, typically a fast packet network, in accordance with the present invention. Upon enqueueing (401), traffic classes of fast packets are separated into traffic classes for buffering, for example, group 1 (403) for buffering CBO fast packets, group 2 (404) for buffering digitized speech fast packets (also known as packet voice), and group 3 (405) for buffering framed data fast packets. Enqueueing substantially moves fast packets from a switch output port to output queues, and dequeueing substantially moves fast packets from output queues to an output trunk.

A number of queues for each traffic class is selectable, depending at least on grade of service desired in terms of delay, throughput, and accuracy. In one embodiment, as illustrated in FIG. 5, numeral 500, a nominal configuration of queues for an internodal trunk may comprise seven queues: high (507), medium (508), and low (509) grade of service queues for CBO fast packets; one queue for digitized speech fast packets (506); and high (511), medium (512), and low (513) grade of service queues for framed data fast packets. The present invention includes a device and method for achieving a high-rate queueing discipline for scan table-based dequeueing utilizing, for example, a pre-computed Head-Of-Line-Priority (HOLP)(514) and weighted round-robin (WRR)(522) based scan table for at least two different traffic classes, for example, CBO, speech, and data. Further, a packet discarding protocol (in the discarder, 515) is utilized for digitized speech fast packets prior to invoking the WRR technique in the scan table-based dequeuer (522).

Figure 6:
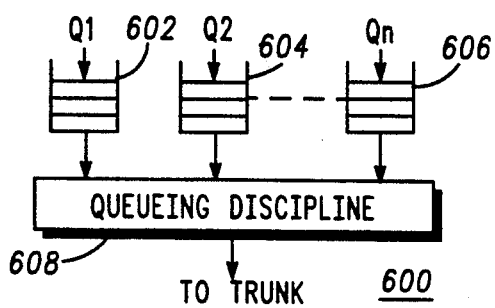
FIG. 6 depicts an embodiment of the present invention wherein the scan table based trunk queueing discipline services n queues.

FIG. 6, numeral 600, FIG. 6 depicts an embodiment of the present invention wherein the scan table based trunk queueing discipline services n queues. n queues (602, 604, ...) are served according to a selected queueing discipline (608); for HOLP, where, for example, $Q_1$ (602) has a highest priority and $Q_n$ (606) has a lowest priority, each time the trunk is ready to accept a packet, a server examines $Q_1, Q_2, \ldots Q_n$ (602, 604, ... 606) until a packet is found; for WRR, the server examines queues cyclically in a prescribed order. New traffic classes may be added.

A typical discarding mechanism packet select discarder includes a discard priority selector for comparing a discard priority for a selected fast packet of a selected fast packet queue with queue depth of at least one fast packet queue. In a selected discarding mechanism, water-marks corresponding to selected discard priorities are provided in different traffic class queues. All arriving packets are put into a queue until the queue is filled (i.e., the last water-mark is exceeded), and the packet in the front of the queue is dropped. If a queue is not full, packets can be discarded from the front of the queue at the instant of packet departure (departure time discarding) from the queue or at the instant of packet arrival (arrival time discarding) to the queue.

An exemplary embodiment of a weighted round-robin (WRR) based scan table in accordance with the present invention, wherein the scan table is typically precomputed and stored in memory is illustrated below.

the dequeueing process to employ for scanning queues, typically N scans for a physical channel having N queues (i.e., within N scans, one may find a fast packet; alternatively, within N scans one may determine that all queues are empty); and maximizing interleaving of differing traffic class fast packets to minimize delay jitter for each queue group.

In one embodiment the scan table utilized in dequeueing is constructed by:

1) constructing an intermediate WRR table to correspond to a WRR discipline between queue groups, wherein the WRR table is typically a linear table that contains entries corresponding to each of the differing traffic class groups such as CBO, speech, and data queue groups;
2) augmenting the WRR table by adding an additional row and more entries, where desired, to ensure that a number of scans needed to find a packet is bounded and minimum; and
3) substituting actual queue IDs (QID) in a desired order, typically in accordance with a HOLP technique.

One example of construction of an intermediate WRR table includes the following steps:

A) determination of a number of entries per queue group; and
B) distribution of queue group entries in the intermedi-

| Index | 1 | 2 | 3 | 4 | 5 | 6 | 7 | 8 |
|---|---|---|---|---|---|---|---|---|
| Queue ID | QID-2 | QID-3 | QID-1 | QID-1 | QID-2 | QID-3 | QID-1 | QID-1 |
| Jump Index | 3 | 3 | 4 | 5 | 7 | 7 | 8 | 1 |

In this exemplary embodiment a scan table is precomputed and stored in memory, typically a RAM, such that each entry of the scan table contains three rows: a first row for an index of that entry; a second row for the identifier of a queue (QID) to be examined in dequeueing during processing; and a third row for an index to jump to next if a packet is found in the queue just examined. Utilization of the scan table is illustrated as follows: where dequeueing begins by attempting to pull out a packet from QID-2 first and a packet is not available, the dequeue process examines QID-3 next. Otherwise, if a packet is available, it is transmitted on the trunk and the next queue to be examined (queue QID-1) is found by jumping to Index 3 in the scan table, the value of the Jump Index in the first column. Thus, where a packet is not found, the Index is incremented by one modulo a length of the table, and if a packet is found, the dequeueing process jumps to the index contained in the jump index for that entry. In the above exemplary embodiment, queues QID-2 and QID-3 belong to a first queue group, with queue QID-2 having a higher priority than QID-3. QID-1 comprises a second queue group. Thus, a weighted round-robin technique is established between the two queue groups wherein the first queue group is allocated one-third of the trunk bandwidth and the second queue group is allocated two-thirds of the trunk bandwidth. Clearly, any desired scan table-based of the WRR and HOLP may be implemented by proper selection of table entries. The construction of a scan table is typically influenced by the following factors, among others: consideration of fractions of physical bandwidth desired to be utilized for each traffic class; differing size packets for queues; a smallest removable unit of information being a fast packet; amount of memory available for storing the scan table; determination of a desired scan number limit for ate WRR table.

Determination of a number of entries per queue group in an intermediate WRR table is generally determined utilizing the following:

M = number of queue groups (e.g., CBO, speech, and data)

$f_r$ = fraction of trunk bandwidth to be allocated to queue group r $L_r$ = average packet length in queue group r T = desired length of the intermediate WRR table $N_r$ = number of entries from queue group r to be put in the intermediate WRR table.

Since a fraction $f_r$ of the trunk bandwidth is allocated to queue group r, $N_s$, for example, may be determined:

$$N_s = \frac{T}{\sum_{r=0}^{M-1} \frac{f_r L_s}{f_s L_r}}$$

and $$\frac{N_r}{N_s} = \frac{f_r L_s}{f_s L_r}$$

for $0 \leq r \leq M-1$, $0 \leq s \leq M-1$ may be utilized to determine remaining $N_r$'s. The $N_r$'s are floating point numbers, rounded off as $N_r = \max(1, [N_r + 0.5])$ where the notation [x] refers to a largest integer less than or equal to x. Rounding may result in a different value of T than that selected as desired. However, where a difference between a rounded value of T and a desired value of T is limited to M, and, where T is much larger than M/2, percentage error is small.

An exemplary determination of T is as follows:

$$T = \frac{T_s}{N_Q} - \frac{M}{2},$$

where $T_s$ is a selected desired length of the scan table and $N_Q$ is a total number of queues to be served by the queueing discipline.

Figure 7:
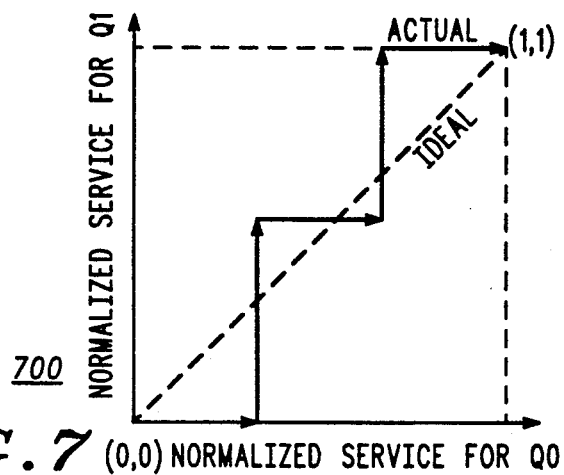
FIG. 7 illustrates a relationship of a normalized service for a first queue (Q0) and a normalized service for a second queue (Q1).

Distribution of queue group entries in the intermediate WRR table is selected to minimize delay jitter for all queues. For example, if there were two queues with $N_0=3$, $N_1=2$, a selected order of service is $Q_0, Q_1, Q_0, Q_1, Q_0, \ldots$ rather than $Q_0, Q_0, Q_0, Q_1, Q_1, \ldots$ For a larger number of queues, to determine orderings of groups, a normalized service received by a queue group is defined to be a ratio of a number of bytes removed from the queue group until some time t (where t is less than a time taken for a complete scan cycle) to a number of bytes removed from the queue group in a complete cycle. At the end of a cycle the normalized service received by each queue will be 1, and will be incremented by $1/N_r$ each time queue group r is served. FIG. 7, numeral 700, depicts a relationship of a normalized service for an ideal case and for an actual case for two queues $(Q_0, Q_1)(N_0=3, N_1=2)$. To establish an ordering of queue groups for the intermediate WRR table such that a normalized service curve tracks an ideal line as closely as possible at each instant in a scan cycle, a minimum distance, min $D_i$ is determined as follows:

Let a current vector of normalized service be given by $$X = (x_0, x_1, \ldots, x_{M-1})$$

where $x_j$ is the normalized service received by group j at the current time. For all groups i, a minimum distance metric, $D_i$, is determined as $$D_i = \sqrt{(y_0^i - z^i)^2 + (y_1^i - z^i)^2 + \ldots + (y_{M-1}^i - z^i)^2}$$

where $$(y_0^i, y_1^i, \ldots, y_{M-1}^i) = \left(x_0, x_1, \ldots, x_i + \frac{1}{N_i}, \ldots, x_{M-1}\right)$$

and $$z^i = \frac{y_0^i + y_1^i + \ldots + y_{M-1}^i}{M}.$$

A group chosen for service next is a group with a smallest $D_i$.

To limit a number of scans to find a packet, each entry in an original WRR table is replaced by a set of new entries that correspond to the IDs of all queue groups in order of appearance in the original table relative to the entry being replaced, and an intermediate WRR table is constructed. For example, for a WRR table containing entries for CBO, speech, and data queue groups (C, S, and D respectively), if an original WRR table is SSSDSC, then a first S entry is replaced by SDC since D and C follow this particular entry in that order in the original table. After doing this, the following table is obtained:

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| S | D | C | S | D | C | S | D | C | D | S  | C  | S  | C  | D  | C  | S  | D  |

Another row is added to the above table to indicate an entry at which the dequeueing should begin scanning the next time it scans queues if it does find a packet in the queue group during the current scan. If no packet is found in a queue group, the next queue group is scanned in this table until a packet is found, or alternatively, until each queue group has been scanned once. The entries in the new row indicate how far the dequeueing would have scanned in the original table before finding a packet, thus allowing jumping over repeated scans in the original table. The new table is set forth below:

| 0 | 1  | 2 | 3 | 4  | 5 | 6 | 7  | 8 | 9  | 10 | 11 | 12 | 13 | 14 | 15 | 16 | 17 |
|---|----|---|---|----|---|---|----|---|----|----|----|----|----|----|----|----|----|
| S | D  | C | S | D  | C | S | D  | C | D  | S  | C  | S  | C  | D  | C  | S  | D  |
| 3 | 12 | 0 | 6 | 12 | 0 | 9 | 12 | 0 | 12 | 15 | 3  | 15 | 0  | 12 | 0  | 3  | 12 |

Note that bottom row entries correspond to jumps to columns that correspond to entries in the original table. A formula relating the last row entries to searched indices is substantially $J = [(I+1)*M] \mod N$ where I is an original table index found by a search, J is a corresponding bottom row entry, M is a number of queue groups, and N is a length of the new table (M times a length of the original table).

An examplary pseudocode for computing WRR table entries is set forth below:

Compute-WRR-Entries:

This routine computes, $N_i$, a number of entries for queue group i in the WRR TABLE.

| Inputs | T | Desired length of WRR TABLE |
| | M | Number of queue groups |
| | f [i] | $f_i$, a fraction of bandwidth to allocate to group i |
| | L [i] | $L_i$, an average packet length in group i |
| Outputs | T | Length of table after integer round-offs |
| | N [i] | $0 \leq i \leq M - 1$ | begin
{
    j = 0    Can be chosen arbitrarily
    sum = 0

```
-continued
Compute-WRR-Entries:
        for (i=0) to (i=M-1) do
                sum = sum + (f [i] * L [j] ) / (f [j] * L [i] )
        Nd [j] = T/sum
        for (i=0) to (i=M-1) do
                Nd [i] = Nd [j] * (f [i] * L [j] ) / (f [j] * L [i])
        Now round off the floating point N [i]'s, and recompute
        T must be recomputed
        T=0
        for (i=0) to (i=M-1) do
        {
                If (Nd [i] < 1)
                   N [i] = 1
                else
                   N [i] = (int) (Nd [i] + 0.5)
                T = T + N [i]
        }
}
end
```

An exemplary pseudocode for distributing the WRR table entries is set forth below:

```
Distribute-WRR-Entries:
This routine distributes the entries in the WRR TABLE. It assumes that
the queue groups are number from 0 to M - 1.
Inputs        M       Number of queue groups
              N [i]   Number of entries fro group i
              T       Length of Wrr TABLE
Output        WrrTable []
begin
{
    for (i=0) to (i=M-1) doInitialize arrays
    {
      CurrentPoint [i] = 0
      NormService [i] = 1.0/N [i]
    }
    for (j=0) to (j=T-1) doj is the WrrTable index
    {
      MinDist = 1000 Any number > 1
      for (i=0) to (i=M-1) do
        NextPoint[i] = Current Point[i]
      for (k=0) to (k=M-1) dok is the queue group index
      {
        If (N[k] > 0) if some entries remain to be inserted
        {
           NextPoint[k] = CurrentPoint[k] NormService[k]
           NearestPt = 0
           for (i=0) to (i=M-1) do
              NearestPt = NearestPt + NextPoint[i]
           NearestPt = NearestPt/M
           dist = 0
           for (i=0) to (i=M-1) do
              dist = dist + (NextPoint [i] - NearestPt) ** 2
           If (dist < MinDist)
           {
              MinDist = dist
              NextQueueGroup = k
           }
        }
      }
      At this stage the next queue group is found
      N [NextQueueGroup] = N [NextQueueGroup} - 1
      WrrTable [j] = NextQueueGroup
      CurrentPoint [NextQueueGroup] =
      CurrentPoint [NextQueueGroup] =
         CurrentPoint[NextQueueGroup]
                  + NormService [NextQueueGroup]
    }
}
end
```

The scan table of the present invention is constructed from the intermediate WRR table by substituting entries for the actual queues to be served, according to the HOLP discipline in the present exemplary embodiment, for entries corresponding to queue groups. In the preferred embodiment, the intermediate WRR table construction is not needed explicitly; it may be combined, where desired, with construction of the scan table. In this embodiment, for each entry in the WRR table (tagged entry), QIDs of that queue group are substituted in a HOLP order, and then the QIDs of all remaining queue groups in an order of the queue group's appearance in the WRR table. Last row entries are determined utilizing $J=[(I+1)*N_Q] \mod T_s$ where I is the index of the queue group in the WRR table that the dequeueing process should serve next if no packet is found in the tagged queue group, and J is the last row entry in the scan table. This process is repeated for each entry of the intermediate WRR table. An exemplary pseudocode for computing a scan table in accordance with the present invention based on an intermediate WRR table is set forth below:

---

Compute-Scan-Table:

---

Computes the scan table from the WRR TABLE. The scan table is assumed to be an array of entries that have two fields each - the QID and the idnex for the next scan.

| Inputs | T | Length of WRR TABLE |
|---|---|---|
|  | WrrTable[] |  |
|  | M | Total number of queue groups |
|  | NumOfQueues[] | Number of queues in group [] |
|  | Nq | Total number of queues |
|  | QID [] [] | QID[i][k] = ID of $k^{th}$ queue in group i |
| Outputs | ScanTable [] |  |

We first define a function that is used by the routine to insert QIDs of a queue group into the scan table once the index for the next scan is computed. The routine itself follows the function definition.

```
beginIsertGroup    (GroupId, group to insert
                    NextScanIndex,
                    CurrPosn, ptr. to curr. posn. in ScanTable
                    ScanTable, NumOfQueues, QID, GroupInserted )
         for (j=1) to (j= NumOfQueues [GroupId] ) do
         {
            ScanTable [CurrPosn] . QID = QID [GroupId] [j]
            ScanTable [CurrPosn] . NextScanIndex = NextScanIndex
            CurrPosn = CurrPosn + 1
         }
         GroupInserted [GroupId] = true
         Assume groups are numbered 1, . . . , M
end
beginComputeScanTable
{
         Ts = T * Nq
         CurrPosn = 0   We begin with the 1st scan table entry
         for (i=0) to (i=T-1) do   i is the WrrTable index
         {
                  for (k=0) to (k=M-1) do
                    GroupInserted [k] = 0   Keeps track of groups inserted
                  Now insert the queue group in WrrTable [i]
                  NextScanIndex = ( (i+1) * Nq) modTs
                    InsertGroup ( WrrTable [i], NextScanIndex, CurrPosn,
                                    ScanTable, NumOfQueues, QID,
                                    GroupInserted)
                  NumOfGrpsInserted = 1         Counts number of queue groups
                                                inserted for WrrTable [i]
                  j = (i+1) modT   Search WrrTable from next entry onwards
                  while (NumOfGrpsInserted < M)
                  {
                          NextGroupFound=0
                          whilenot (NextGroupFound)
                          {
                            if (WrrTable [j] = WrrTable [i] )
                              j = (j+1) modT   Skip over repeats of queue group
                            else
                            {
                              If (GroupInserted [WrrTable [j] ] )
                                j = (j+1) modT    Skip if already inserted
                              else
                              {
                                NextGroupFound=true
                                NextScanIndex = ((j+1) * Nq) modTs
                                InsertGroup ( WrrTable [i],
                                                NextScanIndex, CurrPosn,
                                                ScanTable, NumOfQueues,
                                                QID, GroupInserted )
                              }
                            }
                          }
                          NumOfGrpsInserted = NumOfGrpsInserted + 1
                  }
             Go on to the next entry in the WrrTable
         }
}
```

```
end
```

The dequeueing process utilizes the scanning table to implement a queueing discipline. The following exemplary embodiment employs an exemplary pseudocode providing for the scan table to be stored as an array (ScanTable) of entries, typically in a RAM, where each entry has two fields. A first field of the entry is a QID and a second field is an index of the entry in the array the dequeue process should begin scanning from in a next scan if a packet is found in that QID (next scan index or jump index). It is assumed that the dequeue process gets a signal whenever a buffer on an output port is available, at which time the dequeue process moves a packet from the output queues to the buffer and executes the following pseudocode. Assume that the variable CurrentEntry contains the array index of the ScanTable from which the scan must begin, the variable QueueLen (QID) contains the current queue length of the queue with ID QID and watermark (qid,dp) returns the threshold for discarding a packet with discard priority dp when dequeued from a queue with ID QID. Departure time discarding is utilized in this exemplary description.

An exemplary pseudocode for utilizing a scan table is set forth below:

predetermined upper limit) when a queue is visited so that the per packet number of visits to a queue may be decreased.

To implement such an embodiment of the present invention, the scan table comprises a simple list of the queue groups with a list of QIDs and a maximum number of packets that can be pulled out from the queue group. Thus, the dequeue process visits each group in turn and pulls out at most $N_i$ packets from queue group i, starting from a highest priority queue and successively examining a next lower priority queue in a case where there are no packets in a current queue being examined. In implementing this exemplary embodiment, $N_i$'s are computed as described above. Then, $J_i$ is selected to be a maximum jitter in units of bits that may be removed from service of queue group i. Where $N_j$ violates a selected constraint:

$$N_j \leq J_j \frac{f_j}{1-f_j} \frac{1}{L_j},$$

all $N_i$'s must be multiplied by a number $A_j$ where

```
begin
{
    CurrentEntry = 0
    doforever
    {
        QID = ScanTable[CurrentEntry].QID
        ifQueueEmpty(QID)
            (CurrentEntry = [CurrentEntry + 1]) modTs
        else
        {
            do
            {
                FetchPacket(QID, OutputBuffer)
                DecrementQueueLength(QID)
                if(QueueLen(QID)+1 > watermark(QID,dp))
                    Discard Packet
                else
                    Transmit Packet
            }
            while(QueueLen(QID)+1 > watermark(QID,dp))
            CurrentEntry = ScanTable[CurrentEntry].NextScanIndex
        }
    }
}
end
```

In a case of very high-speed trunks, a packet transmission time may be small enough that interleaving packets may not be an important consideration. Thus, a larger number of packets may be pulled out of the queues without causing excessive jitter. In such cases, it is desirable to pull out as many packets as possible (up to a $$A_j = J_j \frac{f_j}{1-f_j} \frac{1}{L_j}.$$

Exemplary pseudocode for a very high-speed dequeueing embodiment of the present invention is outlined as follows:

```
begin
{
    i = 0 Queue Group Index
    doforever
    {
        TransmittedPackets = 0
        for(QID=(highest priority queue in group i) to
            (QID=lowest priority queue in group i))
        {
            while((packet in queue QID) and (TransmittedPackets ≦ N[i]))
            {
```

```
            FetchPacket(QID, OutputBuffer)
            DecrementQueueLength(QID)
            If(QueueLen(QID)+1 > watermark(ID,dp))
                    DiscardPacket
            else
            {
                    TransmitPacket
                    TransmittedPackets = TransmittedPackets + 1
            }
         }
       }
     }
  }
end
```

Figure 8:
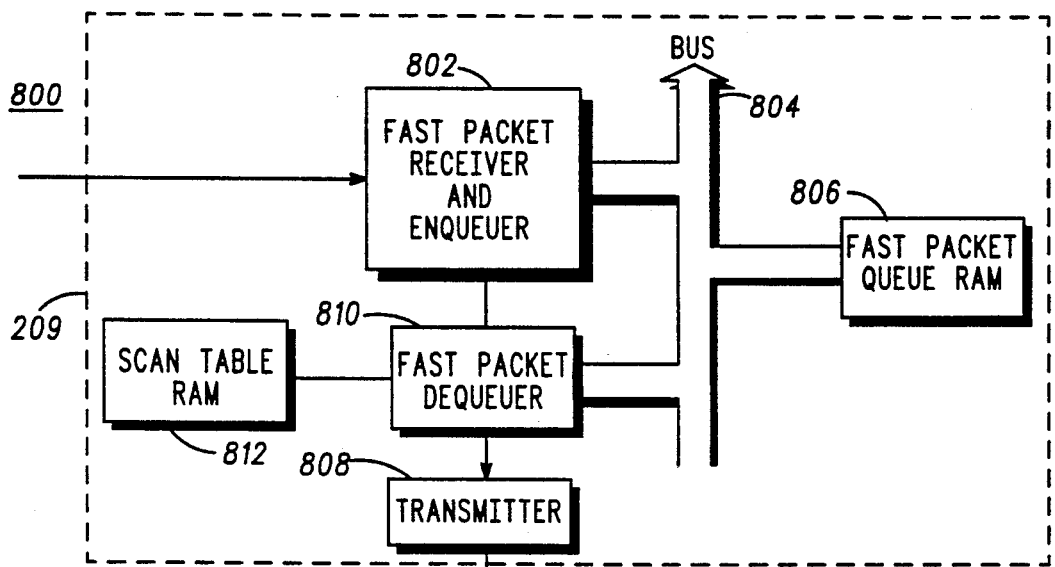
FIG. 8 illustrates a block diagram of one embodiment of a hardware implementation in accordance with the present invention.

Clearly, in one embodiment, illustrated in FIG. 8, numeral 800, the device of the present invention for implementing a high-rate queueing discipline in a fast packet network may be selected to be used with a digital computer, and comprises at least a computer storage medium, for example, a memory (RAM) for a fast packet queue, having a computer program to be executed by the digital computer stored thereon, the computer comprising at least one of: a fast packet receiver and enqueuer (802), operably coupled to the receiver and a bus (804) enqueueing received fast packets; a fast packet dequeuer (810), operably coupled to computer memory (806, 812) and a transmitter (808), where desired, for determining at least a first prioritization of fast packets of at least two different traffic classes and for generating a high-rate queueing discipline (FAST PACKET DEQUEUER)(810) in a fast packet network, typically utilizing a precomputed head-of-line-priority and WRR based scan table stored in RAM (SCAN TABLE RAM) (812), wherein that high-rate queueing substantially determines a scan table-based bandwidth allocated for each traffic class, that high-rate queueing being obtained substantially as described above. It is also clear that the entire method of the present invention may be embodied in a computer program stored on a computer storage medium (not shown), to be executed by a digital computer, the computer program comprising at least: a first unit for receiving at least two different traffic classes; and a second unit, operably coupled to the first unit, for determining at least a first prioritization of fast packets of at least two different traffic classes and for generating a high-rate queueing discipline in a fast packet network utilizing, for example, one of: a precomputed head-of-line-priority scan table, weighted round-robin scan table, and a combined precomputed head-of-line-priority and weighted round-robin based scan table stored in RAM, wherein that high-rate queueing substantially determines a scan table-based bandwidth allocated for each traffic class. Where desired, a transmitter may be operably coupled to the second unit for transmitting prioritized traffic class fast packets in allocated bandwidths. The at least first prioritization may be selected to comprise, for example, a head-of-line prioritization.

In one embodiment, a device for performing a high-rate trunk queueing discipline for a fast packet network having different traffic classes in accordance with the present invention, described more particularly above, comprises: at least a first input receiver, operably coupled to a fast packet network, for receiving first traffic class fast packets from a plurality of first sources; at least a first prioritizer, operably coupled to the at least first input receiver, for prioritizing at least some of the first traffic class fast packets pursuant to a first prioritization method for transmission; at least a second input receiver, operably coupled to the fast packet network, for receiving second traffic class fast packets from a plurality of second sources, which second traffic class is different from the first traffic class; at least a second prioritizer, operably coupled to the at least second input receiver, for prioritizing at least some of the second traffic class fast packets for transmission pursuant to a second prioritization method that is different from the first prioritization method; and a scan table-based dequeuer, operably coupled at least to the first prioritizer and the second prioritizer, for scan table-based dequeueing and transmission of at least the first and second traffic class fast packets. The scan table-based dequeuer typically comprises at least a precomputed head-of-line-priority and weighted round-robin based scan table, operably coupled at least to the first prioritizer and the second prioritizer for substantially determining bandwidth allocation for queues as set forth more particularly above.

The device may further include at least a third input receiver, operably coupled to the fast packet network, for receiving third traffic class fast packets from a plurality of third sources, which third traffic class is different from the first and second traffic classes; and at least a third prioritizer, operably coupled to the at least third input receiver, for prioritizing at least some of the third traffic class fast packets for transmission pursuant to a third priorization method that is different from the first and second prioritization methods. The scan table-based dequeuer is then further coupled to the at least third prioritizer, for scan table-based dequeueing and transmission of at least the first, second, and third traffic class fast packets. The first prioritizer may be selected to comprise a head-of-line prioritizer. Also the second prioritizer may be selected to include a packet select discarder, wherein the packet select discarder typically includes a discard priority selector for comparing a discard priority for a selected fast packet of a selected fast packet queue with queue depth of at least one fast packet queue. The third prioritizer may be selected to comprise a head-of-line prioritizer.

In another embodiment, the scan table-based dequeuer may function at least as a scan table-based bandwidth allocator, operably coupled to at least the first prioritizer and second prioritizer, for substantially obtaining a scan table-based bandwidth allocation for prioritized traffic class fast packets, wherein typically the scan table-based bandwidth allocator comprises at least a precomputed head-of-line-priority and weighted round-robin based scan table, operably coupled at least to the first prioritizer and the second prioritizer for substantially determining bandwidth allocation for selected queues. A transmitter may be operably coupled to the scan table-based bandwidth allocator for transmitting prioritized traffic class fast packets in allocated bandwidths.

The device of the present invention may be incorporated in a multiplexer, if desired. Alternatively, the device of the present invention may be incorporated in a packet switch, if desired.

In one embodiment the present invention may be utilized in one of: a multiplexer and a packet switch, wherein CBO, digitized speech, and framed data packets are processed, the device comprising at least: a first receiver, operably coupled to the fast packet network, for receiving substantially continuous bit-rate fast packets from a plurality of first sources; a first prioritizer, operably coupled to the first receiver, for prioritizing at least some of the substantially continuous bit-rate fast packets pursuant to a first prioritization method for transmission; a second receiver, operably coupled to the fast packet network, for receiving speech fast packets from a plurality of second sources; a second prioritizer, operably coupled to the second receiver, for prioritizing at least some of the speech fast packets pursuant to a second prioritization method for transmission; a third receiver, operably coupled to the fast packet network, for receiving framed data fast packets from plurality of third sources; a third prioritizer, operably coupled to the third receiver, for prioritizing at least some of the framed data fast packets pursuant to a third prioritization method for transmission; and a scan table-based dequeuer, operably coupled at least to first prioritizer, the second prioritizer, and the third prioritizer, to provide scan table-based dequeueing and transmission of the prioritized fast packets. As above, the scan table-based dequeuer typically comprises at least a precomputed head-of-line-priority and weighted round-robin based scan table, operably coupled at least to the first prioritizer and the second prioritizer for substantially determining bandwidth allocation for queues. Also, the first prioritizer may be selected to comprise a head-of-line prioritizer, and the third prioritizer to comprise a head-of-line prioritizer, as desired. Typically at least some of the digitized speech fast packets include discard priority information, and the second prioritizer includes at least a packet discarding protocol to utilize the discard priority information to identify packets to discard.

In one embodiment the device of the present invention may be utilized, for example, in one of: a multiplexer and a packet switch, to process at least two of: substantially continuous bit-rate fast packets from a plurality of first sources, framed data fast packets from plurality of second sources, and digitized speech fast packets from a plurality of third sources.

In an altered embodiment, the device of the present invention may be selected to comprise at least: a first receiver, operably coupled to the fast packet network, for receiving continuous bit-rate fast packets from a plurality of first sources; first storage means, operably coupled to the first receiver, for storing at least some of the substantially continuous bit-rate fast packets in at least a first queue and a second queue; a first prioritizer, operably coupled to the first storage means, for prioritizing at least some of the substantially continuous bit-rate fast packets as stored in the at least first and second queues pursuant to a first prioritization method for transmission; a second receiver, operably coupled to the fast packet network, for receiving digitized speech fast packets from a plurality of third sources; a second prioritizer, operably coupled to the second receiver, for discarding at least some of the digitized speech fast packets, from time to time pursuant to a packet discarding protocol, to provide digitized speech fast packets for transmission; a third receiver, operably coupled to the fast packet network, for receiving data fast packets from a plurality of second sources; second storage means, operably coupled to the third receiver, for storing at least some of the framed data fast packets in at least a third queue and a fourth queue; a third prioritizer, operably coupled to the second storage means, for prioritizing at least some of the framed data fast packets as stored in the at least third and fourth queues pursuant to a third prioritization method for transmission; and a scan table-based dequeuer, operably coupled at least to first prioritizer, the second prioritizer, and the third prioritizer, to provide scan table-based dequeueing and transmission of at least substantially continuous bit-rate fast packets, digitized speech fast packets, and framed data fast packets utilizing at least a precomputed head-of-line-priority and weighted round-robin based scan table scan table-based bandwidth allocation. The scan table-based dequeuer includes a precomputed head-of-line-priority and weighted round-robin based scan table stored in a memory (RAM) device.

In this embodiment the substantially continuous bit-rate fast packets are stored in the first queue and the second queue as a function in part of a packetization time of CBO sources, the substantially continuous bit-rate fast packets from sources having a relatively small packetization time are stored in the first queue, and the fast packets having a relatively large packetization time are stored in the second queue. The substantially continuous bit-rate fast packets from sources with relatively medium packetization times are typically stored in additional queues that are served via HOLP with the first and second queues. For the framed data fast packets, the third queue and the fourth queue for storage are determined as a function, at least in part, of the burst size of the framed data sources, the third queue being utilized for storage of fast packets from sources having a relatively small burst size, and the fourth queue being utilized for storage of fast packets from sources having a relatively large burst size. Relatively medium burst sizes are typically stored in additional queues that are served via HOLP with the third and fourth queues.

Figure 9:
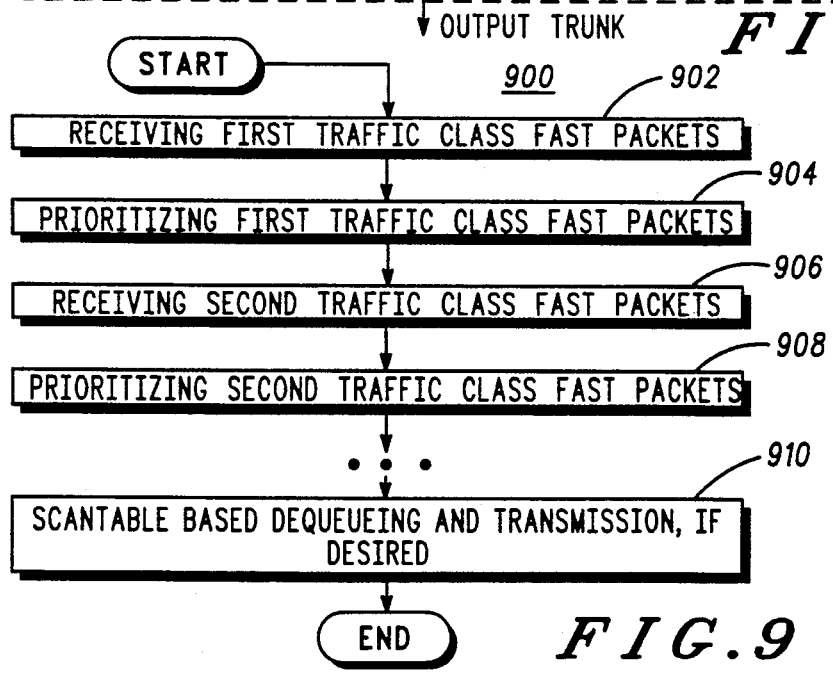
FIG. 9 is a flow diagram illustrating the steps executed in accordance with the method of the present invention.

The method of the present invention, illustrated in FIG. 9, numeral 900, comprises steps for performing a high-rate trunk queueing discipline for a fast packet network having different traffic classes. The method includes steps of: receiving first traffic class fast packets from a plurality of first sources (902); prioritizing at least some of the first traffic class fast packets pursuant to a first prioritization method for transmission (904); receiving second traffic class fast packets from a plurality of second sources, which second traffic class is different from the first traffic class (906); prioritizing at least some of the second traffic class fast packets for transmission pursuant to a second prioritization method that is different from the first prioritization method (908); and scan table-based dequeueing and transmitting, where desired, at least the first and second traffic class fast packets (910). Hybrid queueing includes at least a step of utilizing a precomputed head-of-line-priority and weighted round-robin based scan table for substantially determining bandwidth allocation for queues, described more fully above. The scan table-based dequeuer may be selected, where desired, to include a precomputed head-of-line-priority and weighted round-robin based scan table stored in a memory (RAM) device.

The method may be selected such that at least the first prioritization method includes a head-of-line prioritization method and the second prioritization method includes a packet discarding protocol. Typically, as above, the packet discarding protocol includes the step of comparing a discard priority for a selected fast packet of a selected fast packet queue with queue depth of at least one fast packet queue.

The method clearly may be implemented, with variations as desired, for any selected number of different traffic classes, as is apparent from the above description of the device of the present invention, without departing from the invention. Although fast packets are described more fully above, it is clear that other information packets may be utilized in the present invention. Also, although exemplary embodiments of the invention and of pseudocode in accordance with the present invention are described above, it will be obvious to those skilled in the art that many alterations and modifications may be made without departing from the invention. Such modifications may include different prioritization methods to gain speed and other advantages. Accordingly, it is intended that all such alterations and modifications be included within the spirit and scope of the invention as defined in the appended claims.

We claim:

1. A device for implementing queueing disciplines at high speeds for a network having different traffic class information, comprising:
   A) at least a first input receiver, operably coupled to a network, for receiving first traffic class information from a plurality of first sources;
   B) at least a first prioritizer, operably coupled to the at least first input receiver, for prioritizing at least some of the first traffic class information pursuant to a first prioritization method for transmission;
   C) at least a second input receiver, operably coupled to an information network, for receiving second traffic class information from a plurality of second sources, which second traffic class is different from the first traffic class;
   D) at least a second prioritizer, operably coupled to the at least second input receiver, for prioritizing at least some of the second traffic class information for transmission pursuant to a second prioritization method that is different from the first prioritization method;
   E) a scan table-based dequeuer, operably coupled at least to the first prioritizer and the second prioritizer, for scan table-based dequeueing and transmission of at least the first and second traffic class information.

2. The device of claim 1, wherein the scan table-based dequeuer comprises at least a queueing discipline based table, operably coupled at least to the first prioritizer and the second prioritizer for substantially determining bandwidth allocation for queues.

3. The device of claim 2, wherein the queueing discipline-based table comprises one of:
   A) a precomputed head-of-line queueing based scan table;
   B) a weighted round robin queueing based scan table; and
   C) a scan table based on a combination of precomputed head-of-line queueing and weighted round robin queueing.

4. The device of claim 1, further including:
   A) at least a third input receiver, operably coupled to the information network, for receiving third traffic class information from a plurality of third sources, which third traffic class is different from the first and second traffic classes; and
   B) at least a third prioritizer, operably coupled to the at least third input receiver, for prioritizing at least some of the third traffic class information for transmission pursuant to a third prioritization method that is different from the first and second prioritization methods.

5. The device of claim 4, wherein the scan table-based dequeuer is further coupled to the at least third prioritizer, for scan table-based dequeueing and transmission of at least the first, second, and third traffic class information.

6. The device of claim 4, wherein the first prioritizer comprises a head-of-line prioritizer.

7. The device of claim 4, wherein the second prioritizer includes a packet select discarder.

8. The device of claim 7, wherein the packet select discarder includes a discard priority selector for comparing a discard priority for a selected information of a selected information queue with queu depth of at least one information queue.

9. The device of claim 4, wherein the third prioritizer comprises a head-of-line prioritizer.

10. A device for performing a high-rate trunk queueing discipline for different traffic classes in a fast packet network, comprising:
    A) at least a first receiver and a second receiver, each operably coupled to the fast packet network, each for receiving traffic information for a separate traffic class;
    B) at least a first prioritizer and a second prioritizer, each operably coupled to the at least first receiver and second receiver, respectively, each for prioritizing at least some of a received traffic class information for transmission pursuant at least to a first prioritization method and a second, different from the first, prioritization method; and
    C) a scan table-based bandwidth allocator, operably coupled to at least the first prioritizer and second prioritizer, for substantially obtaining a scan table-based bandwidth allocation for prioritized traffic class information.

11. The device of claim 10, wherein the scan table-based bandwidth allocator comprises at least an allocator utilizing a queueing discipline based table, operably coupled at least to the first prioritizer and the second prioritizer for substantially determining bandwidth allocation for queues.

12. The device of claim 11, wherein the queueing discipline-based table comprises one of:
    A) a precomputed head-of-line queueing based scan table;
    B) a weighted round robin queueing based scan table; and
    C) a scan table based on a combination of precomputed head-of-line queueing and weighted round robin queueing.

13. The device of claim 10, further including a transmitter operably coupled to the scan table-based bandwidth allocator for transmitting prioritized traffic class information in allocated bandwidths.

14. The device of claim 10, wherein:
   A) at least the first prioritizer comprises a head-of-line prioritizer; and
   B) the scan table-based bandwidth allocator comprises at least a precomputed head-of-line-priority and weighted round-robin based scan table operably coupled at least to the first prioritizer and the second prioritizer for substantially determining bandwidth allocation for selected queues.

15. A device in a multiplexer for performing a high-rate trunk queueing discipline for different traffic classes in an information network, comprising at least:
   A) a first receiver, operably coupled to the information network, for receiving substantially continuous bit-rate information from a plurality of first sources;
   B) a first prioritizer, operably coupled to the first receiver, for prioritizing at least some of the substantially continuous bit-rate information pursuant to a first prioritization method for transmission;
   C) a second receiver, operably coupled to the information network, for receiving speech information from a plurality of second sources;
   D) a second prioritizer, operably coupled to the second receiver, for prioritizing at least some of the speech information pursuant to a second prioritization method for transmission;
   E) a third receiver, operably coupled to the information network, for receiving framed data information from plurality of third sources;
   F) a third prioritizer, operably coupled to the third receiver, for prioritizing at least some of the framed data information pursuant to a third prioritization method for transmission; and
   G) a scan table-based dequeuer, operably coupled at least to first prioritizer, the second prioritizer, and the third prioritizer, to provide scan table-based dequeueing and transmission of the prioritized information.

16. The device of claim 15, wherein the scan table-based dequeuer comprises at least a precomputed head-of-line-priority and weighted round-robin based scan table, operably coupled at least to the first prioritized and the second prioritizer for substantially determining bandwidth allocation for queues.

17. The device of claim 15, wherein at least one of:
   A) the first prioritizer comprises a head-of-line prioritizer; and
   B) the third prioritizer comprises a head-of-line prioritizer.

18. The device of claim 15, wherein at least some of the digitized speech information includes discard priority information, and wherein the second prioritizer includes at least a packet discarding protocol to utilize the discard priority information to identify packets to discard.

19. A device in a packet switch for performing a high-rate trunk queueing discipline for different traffic classes in an information network, comprising at least:
   A) a first receiver, operably coupled to the information network, for receiving substantially continuous bit-rate information from a plurality of first sources;
   B) a first prioritizer, operably coupled to the first receiver, for prioritizing at least some of the substantially continuous bit-rate information pursuant to a first prioritization method for transmission;
   C) a second receiver, operably coupled to the information network, for receiving speech information from a plurality of second sources;
   D) a second prioritizer, operably coupled to the second receiver, for prioritizing at least some of the speech information pursuant to a second prioritization method for transmission;
   E) a third receiver, operably coupled to the information network, for receiving framed data information from plurality of third sources;
   F) a third prioritizer, operably coupled to the third receiver, for prioritizing at least some of the framed data information pursuant to a third prioritization method for transmission; and
   G) a scan table-based dequeuer, operably coupled at least to first prioritizer, the second prioritizer, and the third prioritizer, to provide scan table-based dequeueing and transmission of the prioritized information.

20. The device of claim 19, wherein the scan table-based dequeuer comprises at least a precomputed head-of-line-priority and weighted round-robin based scan table, operably coupled at least to the first prioritizer and the second prioritizer for substantially determining bandwidth allocation for queues.

21. The device of claim 19, wherein at least one of:
   A) the first prioritizer comprises a head-of-line prioritizer; and
   B) the third prioritizer comprises a head-of-line prioritizer.

22. The device of claim 19, wherein at least some of the digitized speech information includes discard priority information, and wherein the second prioritizer includes at least a packet discarding protocol to utilize the discard priority information to identify packets to discard.

23. A device in a multiplexer for performing a high-rate trunk queueing discipline for different traffic classes in a fast packet network, comprising at least:
   A) a first receiver, operably coupled to the fast packet network, for receiving substantially continuous bit-rate fast packets from a plurality of first sources;
   B) a first prioritizer, operably coupled to the first receiver, for prioritizing at least some of the substantially continuous bit-rate fast packets pursuant to a first prioritization method for transmission;
   C) a second receiver, operably coupled to the fast packet network, for receiving framed data fast packets from plurality of second sources;
   D) a second prioritizer, operably coupled to the second receiver, for prioritizing at least some of the framed data fast packets pursuant to the first prioritization method for transmission; and
   E) a scan table-based dequeuer, operably coupled at least to first prioritizer and the second prioritizer, to provide scan table-based dequeueing and transmission of the prioritized fast packets.

24. The device of claim 23, wherein the first prioritizer comprises a head-of-line prioritizer.

25. The device of claim 23, wherein the scan table-based dequeuer comprises at least a precomputed head-of-line-priority and weighted round-robin based scan table, operably coupled at least to the first prioritizer and the second prioritizer for substantially determining bandwidth allocation for selected queues.

26. The device of claim 23, wherein:
A) at least the first prioritizer comprises a head-of-line prioritizer; and
B) the scan table-based bandwidth allocator comprises at least a precomputed head-of-line-priority and weighted round-robin based scan table, operably coupled at least to the first prioritizer and the second prioritizer for substantially determining bandwidth allocation for selected queues.

27. A device in a packet switch for performing a high-rate trunk queueing discipline for different traffic classes in a fast packet network, comprising at least:
A) a first receiver, operably coupled to the fast packet network, for receiving substantially continuous bit-rate fast packets from a plurality of first sources;
B) a first prioritizer, operably coupled to the first receiver, for prioritizing at least some of the substantially continuous bit-rate fast packets pursuant to a first prioritization method for transmission;
C) a second receiver, operably coupled to the fast packet network, for receiving framed data fast packets from plurality of second sources;
D) a second prioritizer, operably coupled to the second receiver, for prioritizing at least some of the framed data fast packets pursuant to the first prioritization method for transmission; and
E) a scan table-based dequeuer, operably coupled at least to first prioritizer and the second prioritizer, to provide scan table-based dequeueing and transmission of the prioritized fast packets.

28. The device of claim 27, wherein the first prioritizer comprises a head-of-line prioritizer.

29. The device of claim 27, wherein the scan table-based dequeuer comprises at least a precomputed head-of-line-priority and weighted round-robin based scan table, operably coupled at least to the first prioritizer and the second prioritizer for substantially determining bandwidth allocation for selected queues.

30. The device of claim 27, wherein:
A) at least the first prioritizer comprises a head-of-line prioritizer; and
B) the scan table-based bandwidth allocator comprises at least a precomputed head-of-line-priority and weighted round-robin based scan table, operably coupled at least to the first prioritizer and the second prioritizer for substantially determining bandwidth allocation for selected queues.

31. A device in a multiplexer for performing a high-rate trunk queueing discipline for different traffic classes in a fast packet network, comprising at least:
A) a first receiver, operably coupled to the fast packet network, for receiving continuous bit-rate fast packets from a plurality of first sources;
B) first storage means, operably coupled to the first receiver, for storing at least some of the substantially continuous bit-rate fast packets in at least a first queue and a second queue;
C) a first prioritizer, operably coupled to the first storage means, for prioritizing at least some of the substantially continuous bit-rate fast packets as stored in the at least first and second queues pursuant to a first prioritization method for transmission;
D) a second receiver, operably coupled to the fast packet network, for receiving digitized speech fast packets from a plurality of second sources;
E) a second prioritizer, operably coupled to the second receiver, for discarding at least some of the digitized speech fast packets from time to time pursuant to a packet discarding protocol, to provide digitized speech fast packets for transmission;
F) a third receiver, operably coupled to the fast packet network, for receiving data fast packets from a plurality of third sources;
G) second storage means, operably coupled to the third receiver, for storing at least some of the framed data fast packets in at least a third queue and a fourth queue;
H) a third prioritizer, operably coupled to the second storage means, for prioritizing at least some of the framed data fast packets aS stored in the at least third and fourth queues pursuant to a third prioritization method for transmission;
I) a scan table-based dequeuer, operably coupled at least to first prioritizer, the second prioritizer, and the third prioritizer, to provide scan table-based dequeueing and transmission of at least substantially continuous bit-rate fast packet, digitized speech fast packets, and framed data fast packets utilizing at least a precomputed head-of-line-priority and weighted round-robin based scan table having scan table-based bandwidth allocation, wherein the scan table-based dequeuer includes a precomputed head-of-line-priority and weighted round-robin based scan table stored in a memory (RAM) device.

32. The device of claim 31, wherein the substantially continuous bit-rate fast packets are stored in the first queue and the second queue as a function in part of a packetization time of CBO sources.

33. The device of claim 32, wherein the substantially continuous bit-rate fast packets from sources having a relatively small packetization time are stored in the first queue, and the fast packets having a relatively large packetization time are stored in the second queue.

34. The device of claim 33, wherein substaintially continuous bit-rate fast packets from sources with relatively medium packetization times are stored in additional queues that are served via HOLP with the first and second queues.

35. The device of claim 31, wherein, for the framed data fast packets, the third queue and the fourth queue for storage are determined as a function, at least in part, of the burst size of the framed data sources.

36. The device of claim 35, wherein, for framed data fast packets, the third queue is utilized for storage of fast packets from sources having a relatively small burst size, and the fourth queue is utilized for storage of fast packets from sources having a relatively large burst size.

37. The device of claim 36, wherein framed data fast packets from sources with relatively medium burst sizes are stored in additional queues that are served via HOLP with the third and fourth queues.

38. A device in a packet switch for performing a high-rate trunk queueing discipline for different traffic classes in a fast packet network, comprising at least:
A) a first receiver, operably coupled to the fast packet network, for receiving continuous bit-rate fast packets from a plurality of first sources;
B) first storage means, operably coupled to the first receiver, for storing at least some of the substantially continuous bit-rate fast packets in at least a first queue and a second queue;
C) a first prioritizer, operably coupled to the first storage means, for prioritizing at least some of the substantially continuous bit-rate fast packets as stored in the at least first and second queues pursuant to a first prioritization method for transmission;

D) a second receiver, operably coupled to the fast packet network, for receiving digitized speech fast packets from a plurality of second sources;

E) a second prioritizer, operably coupled to the second receiver, for discarding at least some of the digitized speech fast packets from time to time pursuant to a packet discarding protocol, to provide digitized speech fast packets for transmission;

F) a third receiver, operably coupled to the fast packet network, for receiving data fast packets from a plurality of third sources;

G) second storage means, operably coupled to the third receiver, for storing at least some of the framed data fast packets in at least a third queue and a fourth queue;

H) a third prioritizer, operably coupled to the second storage means, for prioritizing at least some of the framed data fast packets as stored in the at least third and fourth queues pursuant to a third prioritization method for transmission;

I) a scan table-based dequeuer, operably coupled at least to first prioritizer, the second prioritizer, and the third prioritizer, to provide scan table-based dequeueing and transmission of at least substantially continuous bit-rate fast packet, digitized speech fast packets, and framed data fast packets utilizing at least a precomputed head-of-line-priority and weighted round-robin based scan table having scan table-based bandwidth allocation, wherein the scan table-based dequeuer includes a precomputed head-of-line-priority and weighted round-robin based scan table stored in a memory (RAM) device.

39. The device of claim 38, wherein the substantially continuous bit-rate fast packets are stored in the first queue and the second queue as a function in part of a packetization time of CBO sources.

40. The device of claim 39, wherein the substantially continuous bit-rate fast packets from sources having a relatively small packetization time are stored in the first queue, and the fast packets having a relatively large packetization time are stored in the second queue.

41. The device of claim 40, wherein substantially continuous bit-rate fast packets from sources with relatively medium packetization times are stored in additional queues that are served via HOLP with the first and second queues.

42. The device of claim 41, wherein, for the framed data fast packets, the third queue and the fourth queue for storage are determined as a function, at least in part, of the burst size of the framed data fast sources.

43. The device of claim 42, wherein, for framed data fast packets, the third queue is utilized for storage of fast packets from sources having a relatively small burst size, and the fourth queue is utilized for storage of fast packets from sources having a relatively large burst size.

44. The device of claim 43, wherein framed data fast packets from sources with relatively medium burst sizes are stored in additional queues that are served via HOLP with the third and fourth queues.

45. A method of performing a high-rate trunk queueing discipline for a fast packet network having different traffic classes, comprising the steps of:

A) receiving first traffic class fast packets from a plurality of first sources;

B) prioritizing at least some of the first traffic class fast packets pursuant to a first prioritization method for transmission;

C) receiving second traffic class fast packets from a plurality of second sources, which second traffic class is different from the first traffic class;

D) prioritizing at least some of the second traffic class fast packets for transmission pursuant to a second prioritization method that is different from the first prioritization method;

E) scan table-based dequeueing and transmitting at least the first and second traffic class fast packets.

46. The method of claim 45, wherein the step of scan table-based dequeueing comprises at least a step of utilizing a precomputed head-of-line-priority and weighted round-robin based scan table for substantially determining bandwidth allocation for queues.

47. The method of claim 45, further including the step of:

A) receiving third traffic class fast packets from a plurality of third sources, which third traffic class is different from the first and second traffic classes; and B) prioritizing at least some of the third traffic class fast packets for transmission pursuant to a third prioritization method that is different from the first and second prioritization methods.

48. The method of claim 45, wherein the first prioritization method includes a head-of-line prioritization method.

49. The method of claim 48, wherein the second prioritization method includes a packet discarding protocol.

50. The method of claim 49, wherein the packet discarding protocol includes the step of comparing a discard priority for a selected fast packet of a selected fast packet queue with queue depth of at least one fast packet queue.

51. The method of claim 47, wherein the third prioritization method includes a head-of-line prioritization method.

52. A method for performing a high-rate trunk queueing discipline for different traffic classes in a fast packet network, comprising the steps of:

A) receiving differing traffic class fast packets;

B) prioritizing at least some of the fast packets for transmission as a function, at least in part, of a first prioritization method; and C) selecting at least some of the prioritized fast packets for transmission as a function, at least in part of a scan table-based bandwidth allocation method, different from the first prioritization method, to provide queued prioritized traffic class fast packets.

53. The method of claim 52, wherein the scan table-based bandwidth allocation method comprises at least the step of utilizing a precomputed head-of-line-priority and weighted round-robin based scan table for substantially determining bandwidth allocation for selected queues.

54. The method of claim 52, further including a step of transmitting prioritized traffic class fast packets in allocated bandwidths.

55. The method of claim 52, wherein:

A) at least the first prioritization method includes a head-of-line prioritization method; and B) the scan table-based bandwidth allocation method includes a step of utilizing at least a precomputed head-of-line-priority and weighted round-robin based scan table for substantially determining bandwidth allocation for selected queues.

56. A method in one of: a multiplexer and a packet switch, for performing a high-rate trunk queueing discipline for different traffic classes in a fast packet network, comprising at least the steps of:
A) receiving at least some substantially continuous bit-rate fast packets from a plurality of first sources;
B) prioritizing at least some of the substantially continuous bit-rate fast packets pursuant to a first prioritization method for transmission;
C) receiving digitized speech fast packets from a plurality of second sources;
D) prioritizing at least some of the digitized speech fast packets pursuant to a second prioritization method for transmission;
E) receiving framed data fast packets from plurality of third sources;
F) prioritizing at least some of the framed data fast packets pursuant to a third prioritization method for transmission; and
G) scan table-based dequeueing and transmitting the prioritized substantially continuous bit-rate fast packets, digitized speech fast packets, and framed data fast packets.

57. The method of claim 56, wherein the step of scan table-based dequeueing comprises at least a precomputed head-of-line-priority and weighted round-robin based scan table, operably coupled at least to the first prioritizer and the second prioritizer for substantially determining bandwidth allocation for queues.

58. The method of claim 56, wherein at least one of:
A) the first prioritization method includes a head-of-line prioritization method; and
B) the third prioritization method includes a head-of-line prioritization method.

59. The method of claim 56, wherein at least some of the digitized speech fast packets include discard priority information, and wherein the second prioritizer includes at least a packet discarding protocol to utilize the discard priority information to identify packets to discard.

60. A method in a one of: a multiplexer and a packet switch, for performing a high-rate trunk queueing discipline for different traffic classes in a fast packet network, comprising at least the steps of:
A) receiving substantially continuous bit-rate fast packets from a plurality of first sources;
B) prioritizing at least some of the substantially continuous bit-rate fast packets pursuant to a first prioritization method for transmission;
C) receiving framed data fast packets from plurality of second sources;
D) prioritizing at least some of the framed data fast packets pursuant to the first prioritization method for transmission; and
E) scan table-based dequeueing and transmission of the prioritized fast packets.

61. The method of claim 60, wherein the first prioritization method includes a head-of-line prioritization method.

62. The method of claim 60, wherein the step of scan table-based dequeueing includes at least a step of utilizing at least a precomputed head-of-line-priority and weighted round-robin based scan table for substantially determining bandwidth allocation for selected queues.

63. The method of claim 60, wherein:
A) at least the first prioritization method comprises a head-of-line prioritization method; and
B) the scan table-based dequeueing step includes at least a step of utilizing at least a precomputed head-of-line-priority and weighted round-robin based scan table for substantially determining bandwidth allocation for selected queues.

64. A method in one of: a multiplexer and a packet switch, for performing a high-rate queueing discipline for different traffic classes in a fast packet network, comprising at least the steps of:
A) receiving continuous bit-rate fast packets from a plurality of first sources;
B) storing at least some of the substantially continuous bit-rate fast packets in at least a first queue and a second queue;
C) prioritizing at least some of the substantially continuous bit-rate fast packets as stored in the at least first and second queues pursuant to a first prioritization method for transmission;
D) receiving digitized speech fast packets from a plurality of second sources;
E) discarding at least some of the digitized speech fast packets from time to time pursuant to a packet discarding protocol, to provide digitized speech fast packets for transmission;
F) receiving data fast packets from a plurality of third sources;
G) storing at least some of the framed data fast packets in at least a third queue and a fourth queue;
H) prioritizing at least some of the framed data fast packets as stored in the at least third and fourth queues pursuant to a third prioritization method for transmission;
I) scan table-based dequeueing and transmitting at least substantially continuous bit-rate fast packets, digitized speech fast packets, and framed data fast packets utilizing at least a precomputed head-of-line-priority and weighted round-robin based scan table having scan table-based bandwidth allocation, wherein the step of scan table-based dequeueing utilizes a precomputed head-of-line-priority and weighted round-robin based scan table stored in a memory (RAM) device.

65. The method of claim 64, wherein the step of storing at least some of the substantially continuous bit-rate fast packets utilizes a method of storing the fast packets in the first queue and the second queue as a function in part of a packetization time of CBO sources.

66. The method of claim 65, wherein the substantially continuous bit-rate fast packets from sources having a relatively small packetization time are stored in the first queue, and the fast packets having a relatively large packetization time are stored in the second queue.

67. The method of claim 66, wherein substantially continuous bit-rate fast packets from sources with relatively medium packetization times are stored in additional queues that are served via HOLP with the first and second queues.

68. The method of claim 64, wherein, for the step of storing at least some of the framed data fast packets, the third queue and the fourth queue for storage are determined as a function, at least in part, of the burst size of the framed data sources.

69. The method of claim 68, wherein, for framed data fast packets, the third queue is utilized for storage of fast packets from sources having a relatively small burst size, and the fourth queue is utilized for storage of fast packets from sources having a relatively large burst size.

70. The method of claim 69, wherein framed data fast packets from sources with relatively medium burst sizes are stored in additional queues that are served via HOLP with the third and fourth queues.

* * * * *

UNITED STATES PATENT AND TRADEMARK OFFICE
CERTIFICATE OF CORRECTION

PATENT NO. : 5,268,900

DATED : Dec. 7, 1993

INVENTOR(S) : Michael G. Hluchyj and Amit Bhargava

It is certified that error appears in the above-identified patent and that said Letters Patent is hereby corrected as shown below:

At column 20, line 28, "with queu" should be --with queue--.

At column 24, line 13, "aS" should be --as--.

At column 28, line 5, "high-rate queueing" should be --high-rate trunk queueing--.

Signed and Sealed this

Thirty-first Day of May, 1994

Attest:

BRUCE LEHMAN

Attesting Officer

Commissioner of Patents and Trademarks